Dec. 7, 1965    H. TIMM    3,222,571
ARRANGEMENT FOR CONTROLLING THE BRIGHTNESS OF DIRECT CURRENT
OPERATED ILLUMINATING AND SIGNALLING LAMPS IN AIR VEHICLES
AND THE LIKE
Filed Oct. 18, 1962    2 Sheets-Sheet 1

United States Patent Office 3,222,571
Patented Dec. 7, 1965

3,222,571
ARRANGEMENT FOR CONTROLLING THE BRIGHTNESS OF DIRECT CURRENT OPERATED ILLUMINATING AND SIGNALLING LAMPS IN AIR VEHICLES AND THE LIKE
Heinz Timm, Regensburg, Germany, assignor to Diehl, Nurnberg, Germany
Filed Oct. 18, 1962, Ser. No. 231,492
Claims priority, application Germany, Oct. 21, 1961, D 37,294
1 Claim. (Cl. 315—130)

The present invention relates to a device for adjusting the brightness of direct current operable illuminating and signalling lamps in air vehicles or aircraft and the like.

It is an object of the present invention to provide a device of this type which will make it possible steplessly to adjust the brightness of lamps from a faint gleam to full brightness.

It is a further object of this invention to provide a device of this type which will operate with a minimum of loss and in which even great variations in the load in the circuit will practically not affect the respective adjusted brightness of the lamps.

These and other objects and advantages of the invention will appear more clearly from the following specification in connection with the accompanying drawings, in which.

Figure 3:
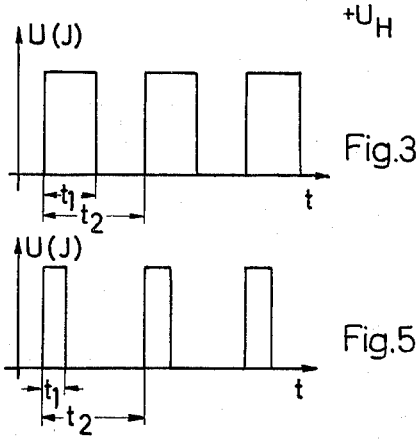
Figure 4:
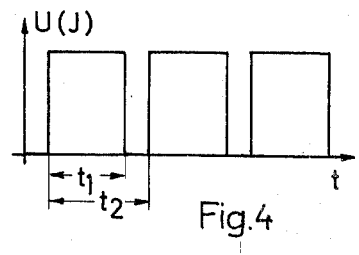
Figure 5:
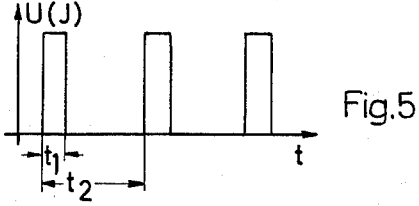

FIGS. 3 to 5 respectively illustrate diagrams for the obtainable current and voltage as function of the time with three different adjustments of the potentiometer.

Figure 1:
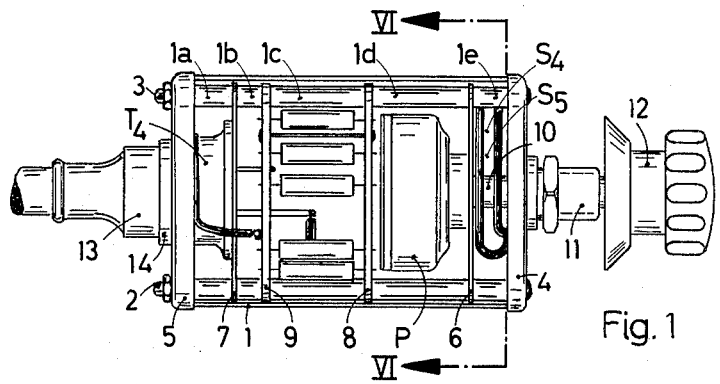
FIG. 1 illustrates a side view of a device according to the invention with the cover partially removed.
Figure 6:
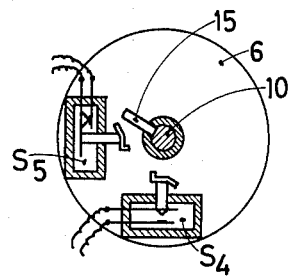

FIG. 6 diagrammatically illustrates a section taken along the line VI—VI of FIG. 1 and showing the limit switches in the device.

Figure 2:
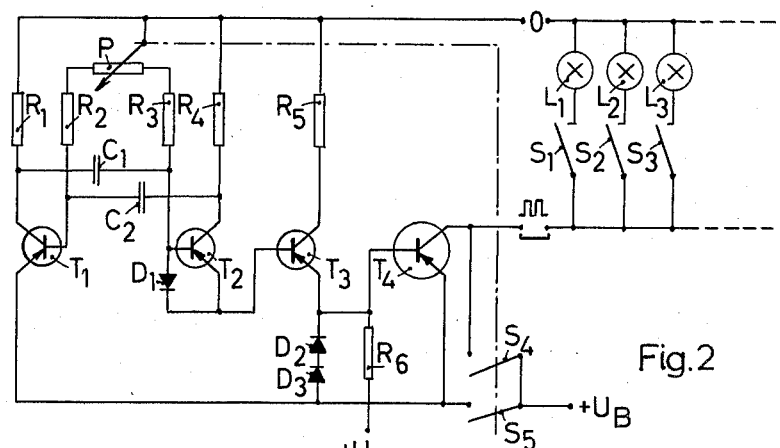
FIG. 2 represents a circuit for the device according to FIG. 1.
Figure 7:
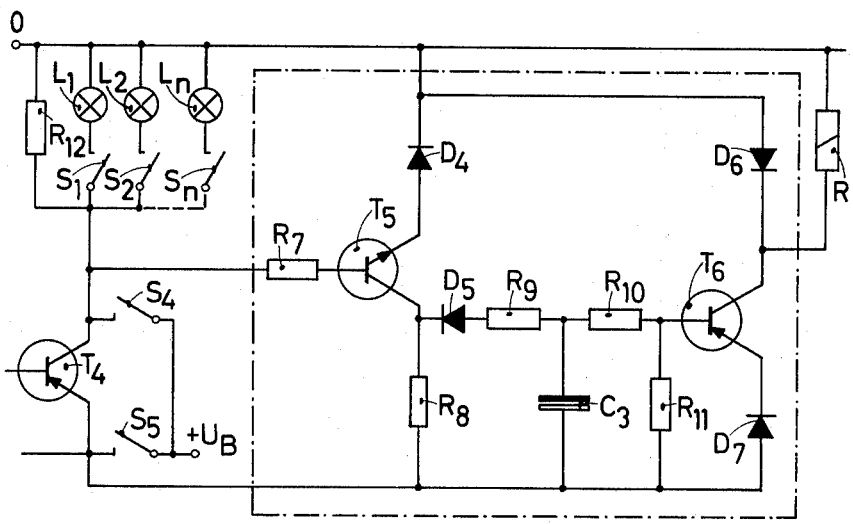

FIG. 7 represents a circuit diagram showing an electronic device for connecting a control relay to the arrangement according to FIGS. 1 and 2.

The device for adjusting the brightness of direct current operated illuminating and signalling lamps, according to the present invention, is characterized primarily in that the common circuit of all lamps includes an electronic switch which comprises means for periodically opening and closing the duty cycle of which is adjustable in conformity with the desired degree of brightness.

As electronic switch there may be employed for instance a suitably rated power transistor which is controlled by an oscillator, preferably through the intervention of an amplification stage. The oscillator may comprise a multivibrator the duty cycle of which may be steplessly adjusted by means of a potentiometer.

In conformity with the invention, the control device comprises a direct current relay which through the intervention of a suitable circuit is connected to the voltage of the lamp circuit.

Referring now to the drawings in detail, FIG. 1 illustrates the mechanical part of a device according to the invention. This mechanical part comprises a cylindrically shaped case 1 having its ends closed by a preferably circular cover plate 4 and a similarly shaped bottom plate 5. Between said plates 4 and 5 there are spacer sleeves 1a, 1b, 1c, 1d and 1e. Between the spacer sleeves 1d and 1e there is provided a connecting plate 6 and similarly between the spacer plates 1a and 1b there is provided a connecting plate 7. Furthermore, between the spacer sleeves 1c and 1d there is provided a control board 8, and similarly between the spacer sleeves 1b and 1c there is provided a control board 9. These control boards are preferably of insulating material. All plates or boards 4 to 9 are at diametrically oppositely located portions at two or three places provided with bores or recesses and together with the sleeves are held together by means of bolts 2, 3 having a head at one end and a nut on the other end.

The outside of the cover plate 4 has a threaded tubular section 11 for centrally arranging the device on the instrument board. In the interior of the device between plates 6 and 8 there is provided a rotatable potentiometer P, the rotatable shaft 10 of which extends through the cover plates 4 and the tube section 11 toward the outside. The end of shaft 10 carries an adjusting knob 12. In the space between the cover plate 4 and the plate 6 there are provided two limit switches $S_4$ and $S_5$ (see FIG. 6) which are operable by shaft 10 of the potentiometer P. The wiring of the device may be in the form of a printed wiring on the two insulated control boards 8 and 9, while electric elements, such as resistors, condensors, diodes, and transistors, may be located between the boards 8 and 9 as illustrated.

The outside of bottom plate 5 carries a connecting body 14 with contact pins. This connecting body 14 is through a multiwire cable and a plug 13 provided with corresponding contact sleeves connected to the lamp wires and also connected to the board network. A power transistor $T_4$ provided in the device is arranged in the space between the bottom plate 5 and connecting plate 7. The wiring of the arrangement is clearly shown in FIG. 2.

In FIG. 2 the illuminating and/or signalling lamps are indicated by the characters $L_1$, $L_2$ and $L_3$. One pole of said lamps is electrically connected to mass O whereas the other pole of said lamp is respectively adapted electrically to be connected to a voltage through switches $S_1$, $S_2$ and $S_3$. For purposes of protecting the arrangement against short circuit in the lamp circuit, a current limitor or a fast acting fuse, for instance an electronic fuse, may be provided.

The feeding of the lamp circuit is effected through the board network (of about 24 to 30 volts) while having interposed the power transistor $T_4$ serving as electronic switch. The control of the transistor $T_4$ is effected by a multivibrator equipped with switch transistors $T_1$ and $T_2$ and transistor $T_3$ acting as amplifier. The duty cycle of the multivibrator is variable within wide limits by means of potentiometer P. The circuit includes p-n-p transistors and takes into consideration the fact that the voltage of the board network with regard to mass is positive. When employing n-p-n transistors or when having a negative voltage source, the circuit would have to be changed accordingly.

The positive network voltage $+U_B$ is fed to the arrangement through the intervention of a switch $S_5$. The emitter of the power transistor $T_4$ is directly connected to the network voltage. The emitter of the amplifier transistor $T_3$ receives its positive voltage through two serially arranged silicon diodes $D_2$ and $D_3$. The emitter of the switch transistor $T_1$ likewise receives its network voltage directly. The emitter of the transistor $T_2$ receives its positive voltage through the two silicon diodes $D_2$ and $D_3$ plus the base-emitter section of transistor $T_3$.

In order to be able to block the power transistor $T_4$ safely in the blocking phase, the basis of said power transistor will through resistor $R_6$ receive a positive auxiliary voltage $+U_H$ which is selected by from 4 to 6 volts higher than the network voltage. For purposes of producing this voltage, a direct current converter may be employed. Practically no current is withdrawn from this voltage source.

The control of transistor $T_4$ is to be effected at so high a frequency that no flickering of the lamp will occur.

Advantageously, a frequency of 800 to 1000 cycles per minute will be selected.

The multivibrator is designed in a manner known per se while employing resistors $R_1$ to $R_4$ arranged in the collector and base lines of the transistors $T_1$ and $T_2$. Furthermore, the multivibrator comprises coupling condensors $C_1$ and $C_2$ arranged between the base feeding line of one transistor and the collector feeding line of the other transistor. The potentiometer P for adjusting the duty cycle interconnects the resistors $R_2$ and $R_3$ located in the base lines, while the adjustable terminal of the potentiometer is connected to ground. The emitter of the transistor $T_2$ is connected galvanically to the base of transistor $T_3$ and, similarly, the emitter of transistor $T_3$ is galvanically connected to the base of the power transistor $T_4$. Between base and emitter of transistor $T_4$ there is arranged a silicon diode $D_1$. Furthermore, a resistor $R_5$ is located in the collector feeding line of the transistor $T_3$.

By means of switch $S_4$, the net voltage $+U_B$ may be directly connected to the lamp circuit. As shown in FIG. 6, the switches $S_4$ and $S_5$ are actuated as limit switches from the adjusting knob 12 through shaft 10 of the potentiometer. Switch $S_5$ comprises a working contact. The rotatable shaft of the potentiometer is provided with an adjusting pin 15 so that in the counterclockwise adjusted end position of the shaft 10, the rest contact of switch $S_5$ is open whereas in an intermediate position of shaft 10, switch $S_5$ is closed and switch $S_4$ is still open. In the clockwise adjusted end position of shaft 10, both switches $S_5$ and $S_4$ are closed.

If for instance by rotation of the adjusting knob 12 in clockwise direction, the shaft 10 of potentiometer P is moved into the position shown in FIG. 6, switch $S_5$ is closed and switch $S_4$ is still open. The entire resistance of the potentiometer P is in series with the resistor $R_3$ in the base feeding line to the transistor $T_2$. Therefore, transistor $T_2$ will remain blocked over a considerably longer period of time than transistor $T_1$ in whose base feeding line practically only the relatively low resistor $R_2$ is located. With the transistor $T_2$ blocked, also transistors $T_3$ and $T_4$ are blocked so that the lamp circuit will be connected to voltage through the power transistor $T_4$ only over a time interval $T_1$ (FIG. 5) which is rather small with regard to the duration of cycle $T_2$. Due to the lower intermediate power, the lamps will, therefore, burn only relatively dark. The duty cycle $T_1/T_2$ will be increased during the further rotation of the potentiometer in clockwise direction (FIG. 6) and over an intermediate position (FIG. 3) will finally increase to the value 0.75 (FIG. 4). The lamps now burn nearly at their maximum brightness. When further rotating the potentiometer (FIG. 6) in clockwise direction switch $S_4$ will be closed and thus the network voltage $+U_B$ will be directly connected to the lamp circuit.

Assuming the net voltage to be as constant as possible and furthermore assuming that the direct current source $+U_B$ has a relatively low inner resistance, the adjusted brightness of the lamps will be independent in wide limits from the load. The inner resistance of the power transistor $T_4$ in the opening phase may, therefore, be ignored.

If instead of the suggested device there would be employed a preresistor or a potentiometer for adjusting the degree of brightness, such load independence would not exist. Furthermore, that portion of the voltage drop which is not connected to the lamps would be destroyed in the preresistor and in the potentiometer.

The silicon diode $D_1$ which is located between the base and emitter of the transistor $T_2$ (FIG. 2) brings about that the positive potential for blocking the transistor $T_2$ will also become effective at the base of transistor $T_3$ and will block the latter likewise. In the blocking phase, the silicon diode $D_1$ also brings about that a positive potential somewhat higher than it is prevailing at the emitter will exist at the base of the transistor $T_2$. As a result thereof, a precise blocking of the transistor $T_2$ will be assured. The two silicon diodes $D_2$ and $D_3$ will have a similar function in the emitter feeding line of the transistor $T_3$.

For purposes of controlling the arrangement, a relay R (FIG. 7) may be provided which, when the device fails or no feeding voltage exists, becomes deenergized and its armature will release a signal in a manner known per se. Inasmuch as for energizing the supply relay R, there is available only an intermittent direct current voltage, this intermittent direct current voltage is by means of an electronic device first converted into a constant direct current voltage. To this end, there is provided a n-p-n transistor $T_5$, a voltage divider $R_9$, $R_{10}$, a condenser $C_3$ and a p-n-p transistor $T_6$. The control device is together with the device connected to the board network $+U_B$ through switch $S_5$. The n-p-n transistor $T_5$ has its collector through a resistor $R_8$ connected to the network voltage and by means of its emitter is connected to ground through a silicon diode $D_4$. One layer of the condenser $C_3$ is likewise connected to network voltage. The emitter of the p-n-p transistor T is through a silicon diode $D_7$ connected to the network voltage. The coil of relay R is located between mass and the collector of the transistor $T_6$.

The interrupted direct current voltage furnished by the power transistor $T_4$ is, through a resistor $R_7$ supplied to the base of the transistor $T_5$. The collector of the transistor $T_5$ is through a silicon diode $D_5$ and a resistor $R_9$ connected to the second layer of the condenser $C_3$. Furthermore, this layer is through a resistor $R_{10}$ connected to the base of the transistor $T_6$. Parallel to the coil of relay R there is arranged in blocking direction a diode $D_6$. In addition thereto there is provided a resistor $R_{12}$ in the lamp circuit.

*Operation*

The operation of the arrangement is as follows: When switch $S_5$ is closed and the power transistor $T_4$ is properly in operation, transistor $T_5$ will through resistor $R_7$ receive positive voltage impulses during the conducting phase of the transistor $T_4$. As a result thereof, transistor $T_5$ becomes conductive so that through diode $D_5$ and resistor $R_9$, the upper layer of the condenser $C_3$ will be brought up to a negative potential with regard to the network voltage $+U_B$ which potential is only slightly higher than the potential of the mass. This negative potential is through resistor $R_{10}$ conveyed to the basis of transistor $T_6$ whereby transistor $T_6$ becomes conductive and the relay R will get voltage. The resistors $R_9$ and $R_{10}$ advantageously form a controllable voltage divider so that at the basis of the transistor $T_6$ a suitable negative direct current voltage may be adjusted. Condenser $C_3$ will be so dimensioned that also in the blocking phase and a low duty cycle, through transistor $T_5$ a sufficiently negative potential will be produced at the base of transistor $T_6$ so that transistor $T_6$ will remain permanently conductive, and relay R will not drop off. Diode $D_5$ will, during the blocking phase prevent the blocking off of current through the resistors $R_8$ and $R_9$.

If for some reason the arrangement breaks down, the other resistors $R_{12}$ and $R_7$, the base of transistor $T_5$, will remain connected to mass whereby the transistor $T_5$ will be permanently blocked. Consequently, after a certain time, the layer of condenser $C_3$ which layer is connected to the voltage divider $R_9$, $R_{10}$ will be discharged to such an extent (through diode $D_7$, the base emitter circuit of transistor $T_6$, and a resistor $R_{11}$ brought to a positive potential) that the transistor $T_6$ will likewise be blocked so that relay R will drop off. The silicon diodes $D_4$, $D_7$ in the emitter supply line of transistor $T_5$ and $T_6$ will, in cooperation with the resistors $R_{12}$ and $R_7$, $R_{11}$ bring about a safe blocking of these two transistors. The opening current formed in the coil relay R during the switching-off of transistor $T_6$ will be conducted away through diode $D_6$. With continuously conductive power transistor $T_4$ and with switch S₄ closed, relay R will not be enerized as long as the network voltage +U_B prevails. In this instance, the lamps will burn with maximum brightness.

It is to be understood that the expression "duty cycle," as used in the specification, refers to that fraction of each complete cycle of operation of the multivibrator during which said multivibrator is operative to supply a pulse to cause the electronic switch to be in its conductive state.

It is, of course, to be understood that the present invention is, by no means, limited to the particular constructions shown in the drawings, but also comprises any modifications within the scope of the appended claim.

What I claim is:

A circuit for controlling the brightness of direct current fed illuminating and signalling lamps, especially in aircraft, which comprises a plurality of lamps, a common feeding line connected to said lamps and also connected to a direct current network, an electronic switch in said common feeding line and having a control element, an astable multivibrator connected to said control element of said electronic switch and operable for periodically supplying pulses to said element for opening said switch, adjustable means connected to said astable multivibrator and adjustable to adjust the duration of the pulses supplied to said element by said multivibrator to control the degree of brightness of said lamps while the frequency of said astable multivibrator is maintained high enough that the lamps burn without flickering even in dimmed condition, a direct current control relay, a voltage divider means, a condenser having one side connected to a point along said voltage divider means and having the other side connected to one side of said network, npn-transistor means and a diode connected to the collector thereof arranged in series, said diode on the side thereof opposite said transistor means being connected with one end of said voltage divider means and operable for feeding a direct current voltage interrupted in the rhythm of the voltage of said lamp circuit to said one side of said condenser, a resistor connecting the base of said transistor means to the other side of said network, a diode connecting the emitter of said transistor means to said other side of said network, a pnp transistor connected to receive voltage from said condenser, the collector of said pnp-transistor being connected with said control relay, the silicon diode connecting the emitter of said pnp transistor to said one side of said network, and a further resistor connecting the base of said pnp transistor to said one side of said direct current network.

References Cited by the Examiner
UNITED STATES PATENTS

| | | | |
|---|---|---|---|
| 2,891,195 | 6/1959 | Smyth | 331—113 |
| 2,905,861 | 9/1959 | Ganzenhuber | 315—136 |
| 3,103,618 | 9/1963 | Slater | 307—88.5 |

JOHN W. HUCKERT, *Primary Examiner.*

ARTHUR GAUSS, DAVID J. GALVIN, *Examiners.*